(12) United States Patent
Breslin et al.

(10) Patent No.: US 9,959,786 B2
(45) Date of Patent: May 1, 2018

(54) SURGICAL TRAINING MODEL FOR LAPAROSCOPIC PROCEDURES

(71) Applicant: Applied Medical Resources Corporation, Rancho Santa Margarita, CA (US)

(72) Inventors: Tracy Breslin, Rancho Santa Margarita, CA (US); Katie Black, Rancho Santa Margarita, CA (US); Nikolai Poulsen, Rancho Santa Margarita, CA (US); Serene Wachli, Rancho Santa Margarita, CA (US); Adam Hoke, Shelbyville, IN (US); Michael Palermo, Rancho Santa Margarita, CA (US); Amy Garces, Rancho Santa Margarita, CA (US); Jacqueline DeMarchi, Rancho Santa Margarita, CA (US)

(73) Assignee: Applied Medical Resources Corporation, Rancho Santa Margarita, CA (US)

( * ) Notice: Subject to any disclaimer, the term of this patent is extended or adjusted under 35 U.S.C. 154(b) by 110 days.

(21) Appl. No.: 14/037,005

(22) Filed: Sep. 25, 2013

(65) Prior Publication Data

US 2014/0087347 A1 Mar. 27, 2014

Related U.S. Application Data

(60) Provisional application No. 61/706,591, filed on Sep. 27, 2012.

(51) Int. Cl.
*G09B 23/28* (2006.01)
*G09B 23/30* (2006.01)

(52) U.S. Cl.
CPC .......... *G09B 23/285* (2013.01); *G09B 23/30* (2013.01)

(58) Field of Classification Search
CPC .................................................. G09B 23/285
See application file for complete search history.

(56) References Cited

U.S. PATENT DOCUMENTS

| 184,573 A | 11/1876 | Becker |
| 2,127,774 A | 8/1938 | Jacobson |
| (Continued) | | |

FOREIGN PATENT DOCUMENTS

| CN | 2421706 Y | 2/2001 |
| CN | 2751372 Y | 1/2006 |
| (Continued) | | |

OTHER PUBLICATIONS

European Patent Office, The International Search Report and Written Opinion for International Application No. PCT/US2012/070971, dated Jul. 4, 2014, entitled "Advanced Surgical Simulation Constructions and Methods".

(Continued)

*Primary Examiner* — Thomas Hong
*Assistant Examiner* — Evan Page
(74) *Attorney, Agent, or Firm* — Rimas T. Lukas

(57) ABSTRACT

A surgical training device includes a model comprising a simulated tissue portion mounted in selectable tension onto a plurality of posts connected to a base. Each post includes at least one notch configured for retaining the simulated tissue portion. Mounting the simulated tissue portion that is in the form of a sheet in notches of different heights creates an angled installation of simulated tissue upon which surgical techniques such as cutting and suturing can be practiced in a simulated laparoscopic environment. More than one sheet can be mounted and each sheet can be mounted (Continued)

with selectable tension by pulling the sheet more or less as desired onto the posts. One variation includes a simulated tumor disposed between sheets, angled or wobbly posts and textured and imprinted simulated tissue surfaces to provide various levels of dynamism and difficulty for surgical skills training in a laparoscopic environment.

25 Claims, 4 Drawing Sheets

(56) References Cited

U.S. PATENT DOCUMENTS

| | | | |
|---|---|---|---|
| 2,284,888 A | 6/1942 | Arnell, Jr. | |
| 2,324,702 A | 7/1943 | Hoffman et al. | |
| 2,345,489 A | 3/1944 | Lord | |
| 2,495,568 A | 1/1950 | Coel | |
| 3,766,666 A | 10/1973 | Stroop | |
| 3,775,865 A | 12/1973 | Rowan | |
| 3,789,518 A | 2/1974 | Chase | |
| 3,921,311 A | 11/1975 | Beasley et al. | |
| 3,991,490 A | 11/1976 | Markman | |
| 4,001,951 A | 1/1977 | Fasse | |
| 4,001,952 A | 1/1977 | Kleppinger | |
| 4,321,047 A | 3/1982 | Landis | |
| 4,323,350 A | 4/1982 | Bowden, Jr. | |
| 4,332,569 A | 6/1982 | Burbank | |
| 4,371,345 A * | 2/1983 | Palmer et al. | 434/368 |
| 4,386,917 A | 6/1983 | Forrest | |
| 4,459,113 A | 7/1984 | Boscaro Gatti et al. | |
| 4,481,001 A | 11/1984 | Graham et al. | |
| 4,596,528 A | 6/1986 | Lewis et al. | |
| 4,726,772 A | 2/1988 | Amplatz | |
| 4,737,109 A | 4/1988 | Abramson | |
| 4,789,340 A | 12/1988 | Zikria | |
| 4,832,978 A | 5/1989 | Lesser | |
| 4,867,686 A | 9/1989 | Goldstein | |
| 4,907,973 A | 3/1990 | Hon | |
| 4,938,696 A | 7/1990 | Foster et al. | |
| 4,940,412 A | 7/1990 | Blumenthal | |
| 5,061,187 A | 10/1991 | Jerath | |
| 5,083,962 A | 1/1992 | Pracas | |
| 5,104,328 A | 4/1992 | Lounsbury | |
| 5,149,270 A | 9/1992 | McKeown | |
| 5,180,308 A | 1/1993 | Garito et al. | |
| 5,230,630 A | 7/1993 | Burgett | |
| 5,273,435 A | 12/1993 | Jacobson | |
| 5,295,694 A | 3/1994 | Levin | |
| 5,310,348 A | 5/1994 | Miller | |
| 5,318,448 A | 6/1994 | Garito et al. | |
| 5,320,537 A | 6/1994 | Watson | |
| 5,358,408 A | 10/1994 | Medina | |
| 5,368,487 A | 11/1994 | Medina | |
| 5,380,207 A | 1/1995 | Siepser | |
| 5,403,191 A | 4/1995 | Tuason | |
| 5,425,644 A | 6/1995 | Szinicz | |
| 5,425,731 A | 6/1995 | Daniel et al. | |
| 5,472,345 A | 12/1995 | Eggert | |
| 5,518,406 A | 5/1996 | Waters | |
| 5,518,407 A | 5/1996 | Greenfield et al. | |
| 5,520,633 A | 5/1996 | Costin | |
| 5,541,304 A | 7/1996 | Thompson | |
| 5,620,326 A | 4/1997 | Younker | |
| 5,720,742 A | 2/1998 | Zacharias | |
| 5,722,836 A | 3/1998 | Younker | |
| 5,727,948 A | 3/1998 | Jordan | |
| 5,743,730 A | 4/1998 | Clester et al. | |
| 5,762,458 A | 6/1998 | Wang et al. | |
| 5,769,640 A | 6/1998 | Jacobus et al. | |
| 5,775,916 A | 7/1998 | Cooper et al. | |
| 5,785,531 A | 7/1998 | Leung et al. | |
| 5,800,178 A | 9/1998 | Gillio | |
| 5,803,746 A | 9/1998 | Barrie et al. | |
| 5,807,378 A | 9/1998 | Jensen et al. | |
| 5,810,880 A | 9/1998 | Jensen et al. | |
| 5,814,038 A | 9/1998 | Jensen et al. | |
| 5,850,033 A | 12/1998 | Mirzeabasov et al. | |
| 5,855,583 A | 1/1999 | Wang et al. | |
| 5,873,732 A * | 2/1999 | Hasson | G09B 23/286 434/262 |
| 5,873,863 A | 2/1999 | Komlosi | |
| 5,908,302 A | 6/1999 | Goldfarb | |
| 5,947,743 A | 9/1999 | Hasson | |
| 5,951,301 A | 9/1999 | Younker | |
| 6,080,181 A | 6/2000 | Jensen et al. | |
| 6,083,008 A | 7/2000 | Yamada et al. | |
| 6,113,395 A | 9/2000 | Hon | |
| 6,234,804 B1 | 5/2001 | Yong | |
| 6,336,812 B1 | 1/2002 | Cooper et al. | |
| 6,398,557 B1 | 6/2002 | Hoballah | |
| 6,413,264 B1 | 7/2002 | Jensen et al. | |
| 6,474,993 B1 | 11/2002 | Grund et al. | |
| 6,485,308 B1 | 11/2002 | Goldstein | |
| 6,488,507 B1 | 12/2002 | Stoloff et al. | |
| 6,497,902 B1 | 12/2002 | Ma | |
| 6,511,325 B1 | 1/2003 | Lalka et al. | |
| 6,517,354 B1 | 2/2003 | Levy | |
| 6,568,941 B1 | 5/2003 | Goldstein | |
| 6,620,174 B2 | 9/2003 | Jensen et al. | |
| 6,654,000 B2 | 11/2003 | Rosenberg | |
| 6,659,776 B1 | 12/2003 | Aumann et al. | |
| 6,773,263 B2 | 8/2004 | Nicholls et al. | |
| 6,780,016 B1 | 8/2004 | Toly | |
| 6,817,973 B2 | 11/2004 | Merril et al. | |
| 6,820,025 B2 | 11/2004 | Bachmann et al. | |
| 6,854,976 B1 | 2/2005 | Suhr | |
| 6,857,878 B1 | 2/2005 | Chosack et al. | |
| 6,863,536 B1 | 3/2005 | Fisher et al. | |
| 6,866,514 B2 | 3/2005 | Von Roeschlaub et al. | |
| 6,887,082 B2 | 5/2005 | Shun | |
| 6,929,481 B1 | 8/2005 | Alexander et al. | |
| 6,939,138 B2 | 9/2005 | Chosack et al. | |
| 6,950,025 B1 | 9/2005 | Nguyen | |
| 6,960,617 B2 | 11/2005 | Omidian et al. | |
| 6,997,719 B2 | 2/2006 | Wellman et al. | |
| 7,008,232 B2 | 3/2006 | Brassel | |
| 7,018,327 B1 | 3/2006 | Conti | |
| 7,025,064 B2 | 4/2006 | Wang et al. | |
| 7,056,123 B2 | 6/2006 | Gregorio et al. | |
| 7,080,984 B1 | 7/2006 | Cohen | |
| 7,118,582 B1 | 10/2006 | Wang et al. | |
| 7,255,565 B2 | 8/2007 | Keegan | |
| 7,269,532 B2 | 9/2007 | David et al. | |
| 7,272,766 B2 | 9/2007 | Sakezles | |
| 7,300,450 B2 | 11/2007 | Vleugels et al. | |
| 7,364,582 B2 | 4/2008 | Lee | |
| 7,404,716 B2 | 7/2008 | Gregorio et al. | |
| 7,419,376 B2 | 9/2008 | Sarvazyan et al. | |
| 7,427,199 B2 | 9/2008 | Sakezles | |
| 7,431,189 B2 | 10/2008 | Shelton, IV et al. | |
| 7,441,684 B2 | 10/2008 | Shelton, IV et al. | |
| 7,465,168 B2 | 12/2008 | Allen et al. | |
| 7,467,075 B2 | 12/2008 | Humphries et al. | |
| 7,544,062 B1 | 6/2009 | Hauschild et al. | |
| 7,549,866 B2 | 6/2009 | Cohen et al. | |
| 7,553,159 B1 | 6/2009 | Arnal et al. | |
| 7,575,434 B2 | 8/2009 | Palakodeti | |
| 7,594,815 B2 | 9/2009 | Toly | |
| 7,621,749 B2 | 11/2009 | Munday | |
| 7,646,901 B2 | 1/2010 | Murphy et al. | |
| 7,648,367 B1 | 1/2010 | Makower et al. | |
| 7,648,513 B2 | 1/2010 | Green et al. | |
| 7,651,332 B2 | 1/2010 | Dupuis et al. | |
| 7,677,897 B2 | 3/2010 | Sakezles | |
| 7,775,916 B1 | 8/2010 | Mahoney | |
| 7,780,451 B2 | 8/2010 | Willobee et al. | |
| 7,802,990 B2 | 9/2010 | Korndorffer et al. | |
| 7,803,151 B2 | 9/2010 | Whitman | |
| 7,806,696 B2 | 10/2010 | Alexander et al. | |
| 7,819,799 B2 | 10/2010 | Merril et al. | |
| 7,833,018 B2 | 11/2010 | Alexander et al. | |
| 7,837,473 B2 | 11/2010 | Koh | |
| 7,850,454 B2 | 12/2010 | Toly | |
| 7,850,456 B2 | 12/2010 | Chosack et al. | |

(56) References Cited

U.S. PATENT DOCUMENTS

| | | |
|---|---|---|
| 7,854,612 B2 | 12/2010 | Frassica et al. |
| 7,857,626 B2 | 12/2010 | Toly |
| 7,866,983 B2 | 1/2011 | Hemphill et al. |
| 7,931,470 B2 | 4/2011 | Alexander et al. |
| 7,931,471 B2 | 4/2011 | Senagore et al. |
| 7,988,992 B2 | 8/2011 | Omidian et al. |
| 7,993,140 B2 | 8/2011 | Sakezles |
| 7,997,903 B2 | 8/2011 | Hasson et al. |
| 8,007,281 B2 | 8/2011 | Toly |
| 8,007,282 B2 | 8/2011 | Gregorio et al. |
| 8,016,818 B2 | 9/2011 | Ellis et al. |
| 8,021,162 B2 | 9/2011 | Sui |
| 8,048,088 B2 | 11/2011 | Green et al. |
| 8,083,691 B2 | 12/2011 | Goldenberg et al. |
| 8,116,847 B2 | 2/2012 | Gattani et al. |
| 8,137,110 B2 | 3/2012 | Sakezles |
| 8,157,145 B2 | 4/2012 | Shelton, IV et al. |
| 8,197,464 B2 | 6/2012 | Krever et al. |
| 8,205,779 B2 | 6/2012 | Ma et al. |
| 8,221,129 B2 | 7/2012 | Parry et al. |
| 8,297,982 B2 | 10/2012 | Park et al. |
| 8,308,817 B2 | 11/2012 | Egilsson et al. |
| 8,323,028 B2 | 12/2012 | Matanhelia |
| 8,323,029 B2 | 12/2012 | Toly |
| 8,328,560 B2 | 12/2012 | Niblock et al. |
| 8,342,851 B1 | 1/2013 | Speeg et al. |
| 8,403,674 B2 | 3/2013 | Feygin et al. |
| 8,403,675 B2 | 3/2013 | Stoianovici et al. |
| 8,403,676 B2 | 3/2013 | Frassica et al. |
| 8,408,920 B2 | 4/2013 | Speller |
| 8,425,234 B2 | 4/2013 | Sakezles |
| 8,439,687 B1 | 5/2013 | Morriss et al. |
| 8,442,621 B2 | 5/2013 | Gorek et al. |
| 8,454,368 B2 | 6/2013 | Ault et al. |
| 8,459,094 B2 | 6/2013 | Yanni |
| 8,459,520 B2 | 6/2013 | Giordano et al. |
| 8,460,002 B2 | 6/2013 | Wang et al. |
| 8,469,715 B2 | 6/2013 | Ambrozio |
| 8,469,716 B2 | 6/2013 | Fedotov et al. |
| 8,480,407 B2 | 7/2013 | Campbell et al. |
| 8,480,408 B2 | 7/2013 | Ishii et al. |
| 8,491,309 B2 | 7/2013 | Parry et al. |
| 8,500,753 B2 | 8/2013 | Green et al. |
| 8,512,044 B2 | 8/2013 | Sakezles |
| 8,517,243 B2 | 8/2013 | Giordano et al. |
| 8,521,252 B2 | 8/2013 | Diez |
| 8,535,062 B2 | 9/2013 | Nguyen |
| 8,544,711 B2 | 10/2013 | Ma et al. |
| 8,556,635 B2 | 10/2013 | Toly |
| 8,608,483 B2 | 12/2013 | Trotta et al. |
| 8,613,621 B2 | 12/2013 | Henderickson et al. |
| 8,636,520 B2 | 1/2014 | Iwasaki et al. |
| D699,297 S | 2/2014 | Bahsoun et al. |
| 8,641,423 B2 | 2/2014 | Gumkowski |
| 8,647,125 B2 | 2/2014 | Johns et al. |
| 8,678,831 B2 | 3/2014 | Trotta et al. |
| 8,679,279 B2 | 3/2014 | Thompson et al. |
| 8,696,363 B2 | 4/2014 | Gray et al. |
| 8,708,213 B2 | 4/2014 | Shelton, IV et al. |
| 8,708,707 B2 | 4/2014 | Hendrickson et al. |
| 8,764,449 B2 | 7/2014 | Rios et al. |
| 8,764,452 B2 | 7/2014 | Pravong et al. |
| 8,800,839 B2 | 8/2014 | Beetel |
| 8,801,437 B2 | 8/2014 | Mousques |
| 8,801,438 B2 | 8/2014 | Sakezles |
| 8,807,414 B2 | 8/2014 | Ross et al. |
| 8,808,004 B2 | 8/2014 | Misawa et al. |
| 8,808,311 B2 | 8/2014 | Heinrich et al. |
| 8,814,573 B2 | 8/2014 | Nguyen |
| 8,827,988 B2 | 9/2014 | Belson et al. |
| 8,840,628 B2 | 9/2014 | Green et al. |
| 8,870,576 B2 | 10/2014 | Millon et al. |
| 8,888,498 B2 | 11/2014 | Bisaillon et al. |
| 8,893,946 B2 | 11/2014 | Boudreaux et al. |
| 8,911,238 B2 | 12/2014 | Forsythe |
| 8,915,742 B2 | 12/2014 | Hendrickson et al. |
| 8,945,095 B2 | 2/2015 | Blumenkranz et al. |
| 8,961,190 B2 | 2/2015 | Hart et al. |
| 8,966,954 B2 | 3/2015 | Ni et al. |
| 8,968,003 B2 | 3/2015 | Hendrickson et al. |
| 9,008,989 B2 | 4/2015 | Wilson et al. |
| 9,017,080 B1 | 4/2015 | Placik |
| 9,026,247 B2 | 5/2015 | White |
| 9,050,201 B2 | 6/2015 | Egilsson et al. |
| 9,056,126 B2 | 6/2015 | Hersel et al. |
| 9,070,306 B2 | 6/2015 | Rappel et al. |
| 9,087,458 B2 | 7/2015 | Shim et al. |
| 9,117,377 B2 | 8/2015 | Shim et al. |
| 9,119,572 B2 | 9/2015 | Gorek et al. |
| 9,123,261 B2 | 9/2015 | Lowe |
| 9,129,054 B2 | 9/2015 | Nawana et al. |
| 9,196,176 B2 | 11/2015 | Hager et al. |
| 9,226,799 B2 | 1/2016 | Lightcap et al. |
| 9,257,055 B2 | 2/2016 | Endo et al. |
| 9,265,587 B2 | 2/2016 | Vancamberg et al. |
| 9,295,468 B2 | 3/2016 | Heinrich et al. |
| 9,351,714 B2 | 5/2016 | Ross et al. |
| 9,336,694 B2 | 6/2016 | Shim et al. |
| 9,358,682 B2 | 6/2016 | Ruiz Morales |
| 9,364,224 B2 | 6/2016 | Nicholas et al. |
| 9,364,279 B2 | 6/2016 | Houser et al. |
| 9,370,361 B2 | 6/2016 | Viola et al. |
| 9,373,270 B2 | 6/2016 | Miyazaki |
| 9,439,649 B2 | 9/2016 | Shelton, IV et al. |
| 9,439,733 B2 | 9/2016 | Ha et al. |
| 9,449,532 B2 | 9/2016 | Black et al. |
| 9,468,438 B2 | 10/2016 | Baber et al. |
| 2001/0019818 A1 | 9/2001 | Yong |
| 2002/0168619 A1 | 11/2002 | Provenza |
| 2003/0031993 A1 | 2/2003 | Pugh |
| 2003/0091967 A1 | 5/2003 | Chosack et al. |
| 2003/0176770 A1 | 9/2003 | Merril et al. |
| 2004/0005423 A1 | 1/2004 | Dalton et al. |
| 2004/0248072 A1 | 12/2004 | Gray et al. |
| 2005/0008997 A1 | 1/2005 | Herman |
| 2005/0026125 A1* | 2/2005 | Toly .......................... 434/262 |
| 2005/0084833 A1 | 4/2005 | Lacey et al. |
| 2005/0131390 A1 | 6/2005 | Heinrich et al. |
| 2005/0142525 A1* | 6/2005 | Cotin et al. ................. 434/262 |
| 2005/0192595 A1 | 9/2005 | Green et al. |
| 2005/0196739 A1 | 9/2005 | Moriyama |
| 2005/0196740 A1 | 9/2005 | Moriyana |
| 2005/0214727 A1 | 9/2005 | Stoianovici et al. |
| 2006/0046235 A1 | 3/2006 | Alexander et al. |
| 2006/0252019 A1 | 11/2006 | Burkitt et al. |
| 2006/0275741 A1 | 12/2006 | Chewning et al. |
| 2007/0074584 A1 | 4/2007 | Talarico et al. |
| 2007/0077544 A1 | 4/2007 | Lemperle et al. |
| 2007/0078484 A1 | 4/2007 | Talarico et al. |
| 2007/0148626 A1 | 6/2007 | Ikeda |
| 2007/0166682 A1 | 7/2007 | Yarin et al. |
| 2007/0197895 A1 | 8/2007 | Nycz et al. |
| 2007/0225734 A1 | 9/2007 | Bell et al. |
| 2007/0275359 A1 | 11/2007 | Rotnes et al. |
| 2008/0032272 A1 | 2/2008 | Palakodeti |
| 2008/0032273 A1 | 2/2008 | Macnamara et al. |
| 2008/0052034 A1 | 2/2008 | David et al. |
| 2008/0064017 A1 | 3/2008 | Grundmeyer, III |
| 2008/0076101 A1 | 3/2008 | Hyde et al. |
| 2008/0097501 A1 | 4/2008 | Blier |
| 2008/0108869 A1 | 5/2008 | Sanders et al. |
| 2008/0187895 A1 | 8/2008 | Sakezles |
| 2008/0188948 A1 | 8/2008 | Flatt |
| 2008/0299529 A1 | 12/2008 | Schaller |
| 2009/0068627 A1 | 3/2009 | Toly |
| 2009/0142739 A1 | 6/2009 | Wang et al. |
| 2009/0142741 A1 | 6/2009 | Ault et al. |
| 2009/0143642 A1 | 6/2009 | Takahashi et al. |
| 2009/0176196 A1 | 7/2009 | Niblock et al. |
| 2009/0187079 A1 | 7/2009 | Albrecht et al. |
| 2009/0246747 A1 | 10/2009 | Buckman, Jr. |
| 2009/0298034 A1 | 12/2009 | Parry et al. |
| 2010/0047752 A1 | 2/2010 | Chan et al. |
| 2010/0094312 A1 | 4/2010 | Ruiz Morales et al. |

(56) References Cited

U.S. PATENT DOCUMENTS

| | | |
|---|---|---|
| 2010/0099067 A1 | 4/2010 | Agro |
| 2010/0167248 A1 | 7/2010 | Ryan |
| 2010/0167249 A1 | 7/2010 | Ryan |
| 2010/0167250 A1 | 7/2010 | Ryan et al. |
| 2010/0167253 A1 | 7/2010 | Ryan et al. |
| 2010/0167254 A1 | 7/2010 | Nguyen |
| 2010/0196867 A1 | 8/2010 | Geerligs et al. |
| 2010/0204713 A1 | 8/2010 | Ruiz Morales |
| 2010/0209899 A1 | 8/2010 | Park |
| 2010/0258611 A1 | 10/2010 | Smith et al. |
| 2010/0273136 A1 | 10/2010 | Kandasami et al. |
| 2010/0279263 A1 | 11/2010 | Duryea |
| 2010/0324541 A1 | 12/2010 | Whitman |
| 2011/0046637 A1 | 2/2011 | Patel et al. |
| 2011/0046659 A1 | 2/2011 | Ramstein et al. |
| 2011/0087238 A1 | 4/2011 | Wang et al. |
| 2011/0091855 A1 | 4/2011 | Miyazaki |
| 2011/0137337 A1 | 6/2011 | van den Dool et al. |
| 2011/0200976 A1 | 8/2011 | Hou et al. |
| 2011/0207104 A1 | 8/2011 | Trotta |
| 2011/0218550 A1 | 9/2011 | Ma |
| 2011/0244436 A1 | 10/2011 | Campo |
| 2011/0269109 A2 | 11/2011 | Miyazaki |
| 2011/0281251 A1 | 11/2011 | Mousques |
| 2011/0301620 A1 | 12/2011 | Di Betta et al. |
| 2012/0015337 A1 | 1/2012 | Hendrickson et al. |
| 2012/0015339 A1 | 1/2012 | Hendrickson et al. |
| 2012/0016362 A1 | 1/2012 | Heinrich et al. |
| 2012/0028231 A1 | 2/2012 | Misawa et al. |
| 2012/0045743 A1 | 2/2012 | Misawa et al. |
| 2012/0065632 A1 | 3/2012 | Shadduck |
| 2012/0082970 A1 | 4/2012 | Pravong et al. |
| 2012/0100217 A1 | 4/2012 | Green et al. |
| 2012/0115117 A1 | 5/2012 | Marshall |
| 2012/0115118 A1 | 5/2012 | Marshall |
| 2012/0116391 A1 | 5/2012 | Houser et al. |
| 2012/0148994 A1 | 6/2012 | Hori et al. |
| 2012/0164616 A1 | 6/2012 | Endo et al. |
| 2012/0165866 A1 | 6/2012 | Kaiser et al. |
| 2012/0172873 A1 | 7/2012 | Artale et al. |
| 2012/0179072 A1 | 7/2012 | Kegreiss |
| 2012/0202180 A1 | 8/2012 | Stock et al. |
| 2012/0264096 A1 | 10/2012 | Taylor et al. |
| 2012/0264097 A1 | 10/2012 | Newcott et al. |
| 2012/0282583 A1 | 11/2012 | Thaler et al. |
| 2012/0282584 A1 | 11/2012 | Millon et al. |
| 2012/0283707 A1 | 11/2012 | Giordano et al. |
| 2012/0288839 A1 | 11/2012 | Crabtree |
| 2012/0308977 A1 | 12/2012 | Tortola |
| 2013/0087597 A1 | 4/2013 | Shelton, IV et al. |
| 2013/0101973 A1 | 4/2013 | Hoke et al. |
| 2013/0103092 A1* | 4/2013 | Ballard ................. 606/265 |
| 2013/0105552 A1 | 5/2013 | Weir et al. |
| 2013/0116668 A1 | 5/2013 | Shelton, IV et al. |
| 2013/0157240 A1 | 6/2013 | Hart et al. |
| 2013/0171288 A1 | 7/2013 | Harders |
| 2013/0177890 A1 | 7/2013 | Sakezles |
| 2013/0192741 A1 | 8/2013 | Trotta et al. |
| 2013/0218166 A1 | 8/2013 | Elmore |
| 2013/0224709 A1 | 8/2013 | Riojas et al. |
| 2013/0245681 A1 | 9/2013 | Straehnz et al. |
| 2013/0253480 A1 | 9/2013 | Kimball et al. |
| 2013/0267876 A1 | 10/2013 | Leckenby et al. |
| 2013/0282038 A1 | 10/2013 | Dannaher et al. |
| 2013/0288216 A1 | 10/2013 | Parry, Jr. et al. |
| 2013/0302771 A1 | 11/2013 | Alderete |
| 2013/0324991 A1 | 12/2013 | Clem et al. |
| 2013/0324999 A1 | 12/2013 | Price et al. |
| 2014/0011172 A1 | 1/2014 | Lowe |
| 2014/0017651 A1 | 1/2014 | Sugimoto et al. |
| 2014/0030682 A1 | 1/2014 | Thilenius |
| 2014/0038151 A1 | 2/2014 | Hart |
| 2014/0051049 A1 | 2/2014 | Jarc et al. |
| 2014/0072941 A1 | 3/2014 | Hendrickson et al. |
| 2014/0087345 A1 | 3/2014 | Breslin et al. |
| 2014/0087346 A1 | 3/2014 | Breslin et al. |
| 2014/0087347 A1 | 3/2014 | Tracy et al. |
| 2014/0087348 A1 | 3/2014 | Tracy et al. |
| 2014/0088413 A1 | 3/2014 | Von Bucsh et al. |
| 2014/0093852 A1 | 4/2014 | Poulsen et al. |
| 2014/0093854 A1 | 4/2014 | Poulsen et al. |
| 2014/0099858 A1 | 4/2014 | Hernandez |
| 2014/0106328 A1 | 4/2014 | Loor |
| 2014/0107471 A1 | 4/2014 | Haider et al. |
| 2014/0156002 A1 | 6/2014 | Thompson et al. |
| 2014/0162016 A1 | 6/2014 | Matsui et al. |
| 2014/0170623 A1 | 6/2014 | Jarstad et al. |
| 2014/0186809 A1 | 7/2014 | Hendrickson et al. |
| 2014/0200561 A1 | 7/2014 | Ingmanson et al. |
| 2014/0212861 A1 | 7/2014 | Romano |
| 2014/0220527 A1 | 8/2014 | Li et al. |
| 2014/0220530 A1 | 8/2014 | Merkle et al. |
| 2014/0220532 A1 | 8/2014 | Ghez et al. |
| 2014/0242564 A1 | 8/2014 | Pravong et al. |
| 2014/0246479 A1 | 9/2014 | Baber et al. |
| 2014/0248596 A1 | 9/2014 | Hart et al. |
| 2014/0263538 A1 | 9/2014 | Leimbach et al. |
| 2014/0272878 A1 | 9/2014 | Shim et al. |
| 2014/0272879 A1 | 9/2014 | Shim et al. |
| 2014/0275795 A1 | 9/2014 | Little et al. |
| 2014/0275981 A1 | 9/2014 | Selover et al. |
| 2014/0277017 A1 | 9/2014 | Leimbach et al. |
| 2014/0303643 A1 | 10/2014 | Ha et al. |
| 2014/0303646 A1 | 10/2014 | Morgan et al. |
| 2014/0303660 A1 | 10/2014 | Boyden et al. |
| 2014/0308643 A1 | 10/2014 | Trotta et al. |
| 2014/0342334 A1 | 11/2014 | Black et al. |
| 2014/0349266 A1 | 11/2014 | Choi |
| 2014/0350530 A1 | 11/2014 | Ross et al. |
| 2014/0357977 A1 | 12/2014 | Zhou |
| 2014/0370477 A1 | 12/2014 | Black et al. |
| 2014/0371761 A1 | 12/2014 | Juanpera |
| 2014/0378995 A1 | 12/2014 | Kumar et al. |
| 2015/0031008 A1 | 1/2015 | Black et al. |
| 2015/0037773 A1 | 2/2015 | Quirarte Catano |
| 2015/0038613 A1 | 2/2015 | Sun et al. |
| 2015/0076207 A1 | 3/2015 | Boudreaux et al. |
| 2015/0086955 A1 | 3/2015 | Poniatowski et al. |
| 2015/0132732 A1 | 5/2015 | Hart et al. |
| 2015/0132733 A1 | 5/2015 | Garvik et al. |
| 2015/0135832 A1 | 5/2015 | Blumenkranz et al. |
| 2015/0148660 A1 | 5/2015 | Weiss et al. |
| 2015/0164598 A1 | 6/2015 | Blumenkranz et al. |
| 2015/0187229 A1 | 7/2015 | Wachli et al. |
| 2015/0194075 A1 | 7/2015 | Rappel et al. |
| 2015/0202299 A1 | 7/2015 | Burdick et al. |
| 2015/0209035 A1 | 7/2015 | Zemlock |
| 2015/0209059 A1 | 7/2015 | Trees et al. |
| 2015/0209573 A1 | 7/2015 | Hibner et al. |
| 2015/0228206 A1 | 8/2015 | Shim et al. |
| 2015/0262511 A1 | 9/2015 | Lin et al. |
| 2015/0265431 A1 | 9/2015 | Egilsson et al. |
| 2015/0272571 A1 | 10/2015 | Leimbach et al. |
| 2015/0272574 A1 | 10/2015 | Leimbach et al. |
| 2015/0272580 A1 | 10/2015 | Leimbach et al. |
| 2015/0272581 A1 | 10/2015 | Leimbach et al. |
| 2015/0272583 A1 | 10/2015 | Leimbach et al. |
| 2015/0272604 A1 | 10/2015 | Chowaniec et al. |
| 2015/0332609 A1 | 11/2015 | Alexander |
| 2015/0358426 A1 | 12/2015 | Kimball et al. |
| 2015/0371560 A1 | 12/2015 | Lowe |
| 2015/0374378 A1 | 12/2015 | Giordano et al. |
| 2015/0374449 A1 | 12/2015 | Chowaniec et al. |
| 2016/0000437 A1 | 1/2016 | Giordano et al. |
| 2016/0022374 A1 | 1/2016 | Haider et al. |
| 2016/0030240 A1 | 2/2016 | Gonenc et al. |
| 2016/0031091 A1 | 2/2016 | Popovic et al. |
| 2016/0066909 A1 | 3/2016 | Baber et al. |
| 2016/0070436 A1 | 3/2016 | Thomas et al. |
| 2016/0073928 A1 | 3/2016 | Soper et al. |
| 2016/0074103 A1 | 3/2016 | Sartor |
| 2016/0098933 A1 | 4/2016 | Reiley et al. |
| 2016/0104394 A1 | 4/2016 | Miyazaki |
| 2016/0117956 A1 | 4/2016 | Larsson et al. |

(56) References Cited

U.S. PATENT DOCUMENTS

| | | |
|---|---|---|
| 2016/0133158 A1 | 5/2016 | Sui et al. |
| 2016/0140876 A1 | 5/2016 | Jabbour et al. |
| 2016/0199059 A1 | 7/2016 | Shelton, IV et al. |
| 2016/0220150 A1 | 8/2016 | Sharonov |
| 2016/0220314 A1 | 8/2016 | Huelman et al. |
| 2016/0225288 A1 | 8/2016 | East et al. |
| 2016/0232819 A1 | 8/2016 | Hofstetter et al. |
| 2016/0235494 A1 | 8/2016 | Shelton, IV et al. |
| 2016/0256187 A1 | 9/2016 | Shelton, IV et al. |
| 2016/0256229 A1 | 9/2016 | Morgan et al. |
| 2016/0262736 A1 | 9/2016 | Ross et al. |
| 2016/0262745 A1 | 9/2016 | Morgan et al. |
| 2016/0293055 A1 | 10/2016 | Hofstetter |
| 2016/0296144 A1 | 10/2016 | Gaddam et al. |

FOREIGN PATENT DOCUMENTS

| | | |
|---|---|---|
| CN | 2909427 Y | 6/2007 |
| CN | 101313842 A | 12/2008 |
| CN | 201364679 Y | 12/2009 |
| CN | 201955979 U | 8/2011 |
| CN | 202443680 U | 9/2012 |
| CN | 202563792 U | 11/2012 |
| CN | 202601055 U | 12/2012 |
| CN | 202694651 U | 1/2013 |
| CN | 103050040 A | 4/2013 |
| CN | 203013103 U | 6/2013 |
| CN | 203038549 U | 7/2013 |
| CN | 203338651 U | 12/2013 |
| CN | 203397593 U | 1/2014 |
| CN | 203562128 U | 4/2014 |
| CN | 10388679 A | 6/2014 |
| DE | 41 05 892 | 8/1992 |
| DE | 44 14 832 | 11/1995 |
| DE | 19716341 C2 | 9/2000 |
| EP | 1 024 173 | 8/2000 |
| FR | 2 691 826 | 12/1993 |
| FR | 2 917 876 | 12/2008 |
| FR | 2 917 876 A1 | 12/2008 |
| GB | 2488994 A | 9/2012 |
| JP | 10 211160 | 8/1998 |
| JP | 2001005378 A | 1/2001 |
| JP | 2009236963 A | 10/2009 |
| JP | 3162161 U | 8/2010 |
| JP | 2013127496 A | 6/2013 |
| MX | PA 02004422 A | 11/2003 |
| PT | 106230 | 9/2013 |
| WO | WO 94/06109 | 3/1994 |
| WO | WO 96/42076 | 2/1996 |
| WO | WO 98/58358 | 12/1998 |
| WO | WO 1999/01074 A1 | 1/1999 |
| WO | WO 2000/36577 | 6/2000 |
| WO | WO 2002/38039 A2 | 5/2002 |
| WO | WO 2002/038039 A3 | 5/2002 |
| WO | WO 2004/032095 | 4/2004 |
| WO | WO 2004/082486 A1 | 9/2004 |
| WO | WO 2005/071639 A1 | 8/2005 |
| WO | WO 2006/083963 A2 | 8/2006 |
| WO | WO 2007/068360 | 6/2007 |
| WO | WO 2008/021720 | 2/2008 |
| WO | WO 2009/000939 | 12/2008 |
| WO | 2010/094730 | 8/2010 |
| WO | WO 2010/094730 | 8/2010 |
| WO | WO 2011/035410 A1 | 3/2011 |
| WO | WO 2011/046606 A1 | 4/2011 |
| WO | WO 2011/151304 A1 | 12/2011 |
| WO | WO 2012/149606 A1 | 11/2012 |
| WO | WO 2012168287 A1 | 12/2012 |
| WO | WO 2012175993 | 12/2012 |
| WO | WO 2013/048978 | 4/2013 |
| WO | WO 2013/103956 A1 | 7/2013 |
| WO | WO 2014/022815 | 2/2014 |
| WO | WO 2014/093669 A1 | 6/2014 |
| WO | WO 2015/148817 A1 | 10/2015 |

OTHER PUBLICATIONS

The International Bureau of WIPO, International Preliminary Report on Patentability for International Application No. PCT/US2012/070971, titled "Advanced Surgical Simulation" dated Jun. 24, 2014.

The International Bureau of WIPO, International Preliminary Report on Patentability for International Application No. PCT/US2012/060997, titled "Simulated Tissue Structure for Surgical Training" dated Apr. 22, 2014.

European Patent Office, International Search Report for International Application No. PCT/US2011/053859 A3, dated May 4, 2012, entitled "Portable Laparoscopic Trainer".

European Patent Office, The International Search Report and Written Opinion for International Application No. PCT/US2012/60997, dated Mar. 7, 2013, entitled "Simulated Tissue Structure for Surgical Training".

European Patent Office, The International Search Report and Written Opinion for International Application No. PCT/US2012/070971, dated Mar. 18, 2013, entitled "Advanced Surgical Simulation".

Human Patient Simulator, Medical Education Technologies, Inc., http://www.meti.com (1999) all.

The International Bureau of WIPO, International Preliminary Report on Patentability for International Application No. PCT/US2011/053859, titled "Portable Laparoscopic Trainer" dated Apr. 2, 2013.

European Patent Office, The International Search Report and Written Opinion for International Application No. PCT/US2013/062363, dated Jan. 22, 2014, entitled "Surgical Training Model for Laparoscopic Procedures".

European Patent Office, The International Search Report and Written Opinion for International Application No. PCT/US2013/061949, dated Feb. 17, 2014, entitled "Surgical Training Model for Laparoscopic Procedures".

Anonymous: Realsim Systems—LTS2000, Sep. 4, 2005, pp. 1-2, XP055096193, Retrieved from the Internet: URL:https://web.archive.org/web/2005090403; 3030/http://www.realsimsystems.com/exersizes.htm (retrieved on Jan. 14, 2014).

European Patent Office, The International Search Report and Written Opinion for International Application No. PCT/US2013/062269, dated Feb. 17, 2014, entitled "Surgical Training Model for Transluminal Procedures".

European Patent Office, The International Search Report and Written Opinion for International Application No. PCT/US2013/061557, dated Feb. 10, 2014, entitled "Surgical Training Model for Laparoscopic Procedures".

European Patent Office, The International Search Report and Written Opinion for International Application No. PCT/US2013/061728 dated Oct. 18, 2013, entitled "Surgical Training Model for Laparoscopic Procedures".

Simulab, Hernia Model, http://www.simulab.com/product/surgery/open/hernia-model.

McGill Laparoscopic Inguinal Hernia Simulator, Novel Low-Cost Simulator for Laparoscopic Inguinal Hernia Repair.

University of Wisconsin-Madison Biomedical Engineering, Inguinal Hernia Model, http://bmedesign.engr.wisc.edu/projects/s10/hernia_model/.

Kurashima Y et al, "A tool for training and evaluation of Laparoscopic inguinal hernia repair; the Global Operative Assessment of Laparoscopic Skills—Groin Hernia" American Journal of Surgery, Paul Hoeber, New York, NY, US vol. 201, No. 1, Jan. 1, 2011, pp. 54-61 XP027558745.

European Patent Office, International Search Report for International Application No. PCT/US2011/053859, dated Apr. 5, 2012, titled "Portable Laparoscopic Trainer".

European Patent Office, The International Search Report and Written Opinion for International Application No. PCT/US2013/061728 dated Oct. 18, 2013, entitled "Surgical Training Model for Laparoscopic Procedures."

(56) References Cited

OTHER PUBLICATIONS

European Patent Office, The International Search Report and Written Opinion of the International Searching Authority for International Application No. PCT/US2014/048027 titled "First Entry Model", dated Oct. 17, 2014.
European Patent Office, The International Search Report and Written Opinion for International Application No. PCT/US2014/042998, title; Gallbladder Model, dated Jan. 7, 2015.
The International Bureau of WIPO, International Preliminary Report on Patentability, for PCT application No. PCT/US2013/053497, titled, Simulated Stapling and Energy Based Ligation for Surgical Training, dated Feb. 12, 2015.
The International Bureau of WIPO, International Preliminary Report on Patentability for international application No. PCT/US2013/061728, titled Surgical Training Model for Laparoscopic Procedures, dated Apr. 9, 2015.
The International Bureau of WIPO, International Preliminary Report on Patentability for International Application No. PCT/US2013/062363, titled Surgical Training Model for Laparascopic Procedures, dated Apr. 9, 2015.
The International Bureau of WIPO, International Preliminary Report on Patentability for International Application No. PCT/US2013/062269, titled Surgical Training Model for Laparascopic Procedures, dated Apr. 9, 2015.
The International Bureau of WIPO, International Preliminary Report on Patentability for International Application No. PCT/US2013/061557, titled Surgical Training Model for Laparascopic Procedures, dated Apr. 9, 2015.
The International Bureau of WIPO, International Preliminary Report on Patentability for International Application No. PCT/US2013/061949, titled Surgical Training Model for Laparoscopic Procedures, dated Apr. 9, 2015.
European Patent Office, The International Search Report and Written Opinion for International Application No. PCT/US2015/020574, titled "Advanced First Entry Model for Surgical Simulation," dated Jun. 1, 2015.
European Patent Office, The International Search Report and Written Opinion for International Application No. PCT/US2015/022774, dated Jun. 11, 2015 entitled "Simulated Dissectible Tissue."
Limps and Things, EP Guildford MATTU Hernia Trainer, http://limbsandthings.com/us/products/tep-guildford-mattu-hernia-trainer/.
Lamouche, Guy, et al., "Review of tissue simulating phantoms with controllable optical, mechanical and structural properties for use in optical coherence tomography," Biomedical Optics Express, vol. 3, No. 6, Jun. 1, 2012 (18 pgs.).
Anonymous: Silicone Rubber—from Wikipedia, the free encyclopedia, Feb. 21, 2014, pp. 1-6.
The International Bureau of WIPO, International Preliminary Report on Patentability for International Application No. PCT/US2014/019840, titled Simulated Tissue Structure for Surgical Training, dated Sep. 11, 2015.
Society of Laparoendoscopic Surgeons, "Future Technology Session: The Edge of Innovation in Surgery, Space, and Business" http://www.laparoscopytoday.com/endourology/page/2/ , Figure 1B: http://laparoscopy.blogs.com/laparoscopy_today/images/6-1/6-1_VlaovicPicB.jpg , Sep. 5-8, 2007, 10 pgs.
Miyazaki Enterprises, "Miya Model Pelvic Surgery Training Model and Video," www.miyazakienterprises, printed Jul. 1, 2016, 1 pg.
European Patent Office, International Search Report and Written Opinion for International Application No. PCT/US2015/059668 titled "Simulated Tissue Models and Methods" dated Apr. 26, 2016, 20 pgs.
Australian Patent Office, Patent Examination Report No. 1 for Australian Application No. 2012358851 titled "Advanced Surgical Simulation" dated May 26, 2016, 3 pgs.
European Patent Office, International Search Report and Written Opinion for International Application No. PCT/US2016/032292 titled "Synthetic Tissue Structures for Electrosurgical Training and Simulation," dated Jul. 14, 2016, 11 pgs.
European Patent Office, International Search Report and Written Opinion for International Application No. PCT/US2016/018697 titled "Simulated Tissue Structures and Methods," dated Jul. 14, 2016, 21 pgs.
European Patent Office, International Search Report and Written Opinion for International Application No. PCT/US2016/034591 titled "Surgical Training Model for Laparoscopic Procedures," dated Aug. 8, 2016, 18 pgs.
European Patent Office, The International Search Report and Written Opinion of the International Searching Authority for International Application No. PCT/US2016/036664 titled "Hysterectomy Model", dated Aug. 19, 2016, 15 pgs.
3D-MED Corporation, "Validated Training Course for Laparascopic Skills", https://www.3-dmed.com/sites/default/files/product-additional/product-spec/Validated%20Training%20Course%20for-%20Laparoscopic%20Skills.docx_3.pdf , printed Aug. 23, 2016, pp. 1-6.
3D-MED Corporation, "Loops and Wire #1" https://www.3-dmed.com/product/loops-and-wire-1 , printed Aug. 23, 2016, 4 pgs.
Barrier, et al., "A Novel and Inexpensive Vaginal Hysterectomy Simulatory," Simulation in Healthcare: The Journal of the Society for Simulation in Healthcare, vol. 7, No. 6, Dec. 1, 2012, pp. 374-379.
European Patent Office, Invitation to Pay Additional Fees for International Application No. PCT/US2016/062669, titled "Simulated Dissectible Tissue", dated Feb. 10, 2017, 8 pgs.
European Patent Office, The International Search Report and Written Opinion of the International Searching Authority for International Application No. PCT/US2016/055148 titled "Hysterectomy Model", dated Feb. 28, 2017, 12 pgs.
European Patent Office, Examination Report for European Application No. 14733949.3 titled "Gallbladder Model," dated Dec. 21, 2016, 6 pgs.
European Patent Office, The International Search Report and Written Opinion of the International Searching Authority for International Application No. PCT/US2016/062669 titled "Simulated Dissectible Tissue," dated Apr. 5, 2017, 19 pgs.
European Patent Office, The International Search Report and Written Opinion of the International Searching Authority for International Application No. PCT/US2017/020389 titled "Simulated Tissue Cartridge", dated May 24, 2017, 13 pgs.
The International Bureau of WIPO, International Preliminary Report on Patentability and Written Opinion for International Application No. PCT/US2015/059668, entitled "Simulated Tissue Models and Methods," dated May 26, 2017, 16 pgs.
The International Bureau of WIPO, International Preliminary Report on Patentability for International Application No. PCT/US2016/018697, entitled "Simulated Tissue Structures and Methods," dated Aug. 31, 2017, 14 pgs.
The International Bureau of WIPO, International Preliminary Report on Patentability for International Application No. PCT/US2016/0032292, entitled "Synthetic Tissue Structures for Electrosurgical Training and Simulation," dated Nov. 23, 2017, 2017, 8 pgs.
The International Bureau of WIPO, International Preliminary Report on Patentability for International Application No. PCT/US2016/034591, entitled "Surgical Training Model for Laparoscopic Procedures," dated Dec. 7, 2017, 2017, 14 pgs.
The International Bureau of WIPO, International Preliminary Report on Patentability for International Application No. PCT/US2015/020574, entitled "Advanced First Entry Model for Surgical Simulation," dated Sep. 22, 2016, 9 pgs.
European Patent Office, The International Search Report and Written Opinion of the International Searching Authority for International Application No. PCT/US2016/0043277 titled "Appendectomy Model", dated Oct. 4, 2016, 12 pgs.
The International Bureau of WIPO, International Preliminary Report on Patentability for International Application No. PCT/US2015/022774, titled "Simulated Dissectible Tissue," dated Oct. 6, 2016, 9 pgs.

(56) References Cited

OTHER PUBLICATIONS

European Patent Office, The International Search Report and Written Opinion of the International Searching Authority for International Application No. PCT/US2016/041852 titled "Simulated Dissectible Tissue", dated Oct. 13, 2016, 12 pgs.

The International Bureau of WIPO, International Preliminary Report on Patentability for International Application No. PCT/US2016/036664, entitled "Hysterectomy Model," dated Dec. 21, 2017, 10 pgs.

European Patent Office, International Search Report and Written Opinion for International Application No. PCT/US2013/053497 titled "Simulated Stapling and Energy Based Ligation for Surgical Training" dated Nov. 5, 2013.

European Patent Office, The International Search Report and Written Opinion of the International Searching Authority for International Application No. PCT/US2014/038195 titled "Hernia Model", dated Oct. 15, 2014.

The International Bureau of WIPO, International Preliminary Report on Patentability for International Application No. PCT/US2014/038195, titled Hernia Model, dated Nov. 26, 2015.

The International Bureau of WIPO, International Preliminary Report on Patentability for International Application No. PCT/US2014/042998, titled "Gallbladder Model" dated Dec. 30, 2015.

The International Bureau of WIPO, International Preliminary Report on Patentability for International Application No. PCT/US2014/048027, titled "First Entry Model" dated Feb. 4, 2016.

\* cited by examiner

SURGICAL TRAINING MODEL FOR LAPAROSCOPIC PROCEDURES

CROSS-REFERENCE TO RELATED APPLICATIONS

This application claims priority to and benefit of U.S. Provisional Patent Application Ser. No. 61/706,591 entitled "Surgical training model for laparoscopic procedures" filed on Sep. 27, 2012 which is incorporated herein by reference in its entirety.

FIELD OF THE INVENTION

This application is generally related to surgical training tools, and in particular, to simulated tissue structures and models for teaching and practicing various surgical techniques and procedures related but not limited to laparoscopic, endoscopic and minimally invasive surgery.

BACKGROUND OF THE INVENTION

Medical students as well as experienced doctors learning new surgical techniques must undergo extensive training before they are qualified to perform surgery on human patients. The training must teach proper techniques employing various medical devices for cutting, penetrating, clamping, grasping, stapling, cauterizing and suturing a variety of tissue types. The range of possibilities that a trainee may encounter is great. For example, different organs and patient anatomies and diseases are presented. The thickness and consistency of the various tissue layers will also vary from one part of the body to the next and from one patient to another. Different procedures demand different skills. Furthermore, the trainee must practice techniques in various anatomical environs that are influenced by factors such as the size and condition of the patient, the adjacent anatomical landscape and the types of targeted tissues and whether they are readily accessible or relatively inaccessible.

Numerous teaching aids, trainers, simulators and model organs are available for one or more aspects of surgical training. However, there is a need for model organs or simulated tissue elements that are likely to be encountered and that can be used in practicing endoscopic and laparoscopic, minimally invasive surgical procedures. In laparoscopic or minimally invasive surgery, a small incision, as small as 5-10 mm is made through which a trocar or cannula is inserted to access a body cavity and to create a channel for the insertion of a camera, such as a laparoscope. The camera provides a live video feed capturing images that are then displayed to the surgeon on one or more monitors. At least one additional small incision is made through which another trocar/cannula is inserted to create a pathway through which surgical instruments can be passed for performing procedures observed on the monitor. The targeted tissue location such as the abdomen is typically enlarged by delivering carbon dioxide gas to insufflate the body cavity and create a working space large enough to safely accommodate the scope and instruments used by the surgeon. The insufflation pressure in the tissue cavity is maintained by using specialized trocars. Laparoscopic surgery offers a number of advantages when compared with an open procedure. These advantages include reduced pain, reduced blood and shorter recovery times due to smaller incisions.

Laparoscopic or endoscopic minimally invasive surgery requires an increased level of skill compared to open surgery because the target tissue is not directly observed by the clinician. The target tissue is observed on monitors displaying a portion of the surgical site that is accessed through a small opening. Therefore, clinicians need to practice visually determining tissue planes, three-dimensional depth perception on a two-dimensional viewing screen, hand-to-hand transfer of instruments, suturing, precision cutting and tissue and instrument manipulation. Typically, models simulating a particular anatomy or procedure are placed in a simulated pelvic trainer where the anatomical model is obscured from direct visualization by the practitioner. Simulated pelvic trainers provide a functional, inexpensive and practical means to train surgeons and residents the basic skills and typical techniques used in laparoscopic surgery such as grasping, manipulating, cutting, knot tying, suturing, stapling, cauterizing as well as how to perform specific surgical procedures that utilize these basic skills. Simulated pelvic trainers are also effective sales tools for demonstrating medical devices required to perform these laparoscopic procedures.

One of the techniques mentioned above that requires practice in laparoscopic or minimally invasive surgery is cutting and suturing. Therefore, it is desirable to present a model for practicing cutting and suturing. It is also desirable to have a model that not only simulates the particular anatomy but also presents the anatomy at a particular step or stage of the procedure or isolates a particular step of a procedure for the trainee to practice in a simulated laparoscopic environment. The model is then disposed inside a simulated laparoscopic environment such as a laparoscopic trainer in which it is at least partially obscured from direct visualization. A camera and monitor provide visualization to the practitioner as in real surgery. After a technique is practiced, it is furthermore desirable that such a model permits repeatable practice with ease, speed and cost savings. In view of the above, it is an object of this invention to provide a surgical training device that realistically simulates an anatomy, isolates such anatomy and presents such an anatomy at a particular stage or step of a procedure that also enables repeatable practice. It has been demonstrated that the use of simulation trainers greatly enhances the skill levels of new laparoscopists and are a great tool to train future surgeons in a non-surgical setting. There is a need for such improved, realistic and effective surgical training models.

SUMMARY OF THE INVENTION

According to one aspect of the invention, a surgical training device is provided. The device includes a top cover connected to and spaced apart from a base to define an internal cavity between the top cover and the base. At least one aperture or a penetrable region for accessing the internal cavity is provided. A laparoscopic camera extends into the internal cavity and a video display is connected to the laparoscopic camera and configured to display to a user images captured by the laparoscopic camera. A removable model is disposed inside the internal cavity. The model includes at least one simulated tissue portion connected to a plurality of mounting posts that are connected in spaced apart fashion to a base. Each mounting post includes at least one notch formed in its outer surface and along the longitudinal axis and configured to hold the simulated tissue portion in the location of the at least one notch such that the simulated tissue portion is suspended by a distance from the base.

According to another aspect of the invention, a surgical training device is provided. The device includes a base having an upper surface and a plurality of mounting posts connected to the base and extending upwardly from the upper surface of the base. Each mounting post has a proximal end connected to the base and a tapered distal end. At least one substantially planar simulated tissue portion having an upper surface and a lower surface is provided. Apertures in the simulated tissue portion are connected to the mounting posts such that the simulated tissue portion is suspended by the posts extending through the apertures. The simulated tissue portion is made of flexible and stretchable material such that it is mounted in tension between the plurality of mounting posts. The simulated tissue portion is penetrable with surgical instruments including a suture needle and scalpel. Also, the material is configured to hold sutures without propagating the point of penetration while the simulated tissue portion is held in tension on the posts. Each mounting post includes at least one notch equally spaced from one end of the post such that all the mounting posts have notches at the same height.

According to another aspect of the invention, a method for surgical training is provided. The method includes the step of providing a surgical training model comprising a base having an upper surface. The model includes a plurality of mounting posts connected to the base and extending upwardly from the upper surface of the base. Each mounting post has a proximal end connected to the base and a tapered distal end with the proximal end connected to the base. The method further includes the step of providing at least one substantially planar simulated tissue structure having an upper surface and a lower surface. The simulated tissue structure is flexible and stretchable. The method includes the step of mounting the at least one simulated tissue structure onto the mounting posts. The method includes the step of piercing the simulated tissue structure with the tapered distal ends of the mounting posts to connect the simulated tissue structure to the mounting posts with selectable tension such that the simulated tissue portion is suspended by the posts extending through apertures. The method includes stretching the simulated tissue between mounting posts. The method includes the step of providing apertures in the simulated tissue structure. The method includes the step of providing apertures in the simulated tissue structure prior to mounting the simulated tissue portion to the mounting posts. The method includes the step of providing apertures in the simulated tissue portion wherein the apertures are formed by piercing the simulated tissue structure with the mounting posts in selected locations along the simulated tissue structure. The method includes mounting the at least one planar simulated tissue portion at an angle with respect to the base. The method includes providing a plurality of notches in the mounting posts and locating the simulated tissue structure such that the simulated tissue structure is retained within the notches. The method further includes providing a second planar simulated tissue structure. The method further includes the step of mounting the second simulated tissue structure on the mounting posts. Wherein the step of mounting the at least one simulated tissue structure includes the step of selectively piercing the at least one simulated tissue structure with the distal ends of the mounting posts. Wherein the step of mounting the second simulated tissue structure and the at least one other simulated tissue structure, further includes the step of selectively piercing the at least one simulated tissue structure with the distal ends of the mounting posts. The method includes the step of mounting the second simulated tissue structure above the first simulated tissue structure. The method further includes the step of providing a laparoscopic trainer. The laparoscopic trainer includes a trainer base and a trainer top cover connected to and spaced apart from the base to define an internal trainer cavity between the top cover and the base. The laparoscopic trainer includes at least one aperture or a penetrable region for accessing the internal trainer cavity and a laparoscopic camera extending into and for viewing the internal trainer cavity. A video display connected to the laparoscopic camera and configured to display to a user images captured by the laparoscopic camera is further provided. The method further includes placing the surgical training model into the cavity of the laparoscopic trainer such that it is substantially obscured from view of the user. The method further includes providing a predetermined pathway on an upper surface of the at least one simulated tissue structure and cutting the simulated tissue structure along the predetermined pathway. The method includes cutting the at least one simulated tissue structure with a laparoscopic instrument to create an opening. The method includes laparoscopically suturing the opening closed. The method includes the step of providing a simulated tumor located between the second simulated tissue structure and the at least one other simulated tissue structure. The method includes the step of penetrating the second simulated tissue structure to access the tumor. The method includes the step of observing the surgical training model and procedure with the laparoscope. The method includes laparoscopically excising the tumor from the surgical training model. The method includes the step of suturing the at least one simulated tissue structure and the second simulated tissue structure. The method includes the step of mounting a second simulated tissue structure onto the mounting posts such that it is angled with respect to the at least one other simulated tissue structure. The method includes the step of stretching the at least one simulated tissue structure. Mounting posts that wobble, angulate or rotate polyaxially are provided. The method includes angulating at least one of the mounting posts upon contact with the at least one simulated tissue portion with a surgical instrument.

DETAILED DESCRIPTION OF THE INVENTION

Figure 1:
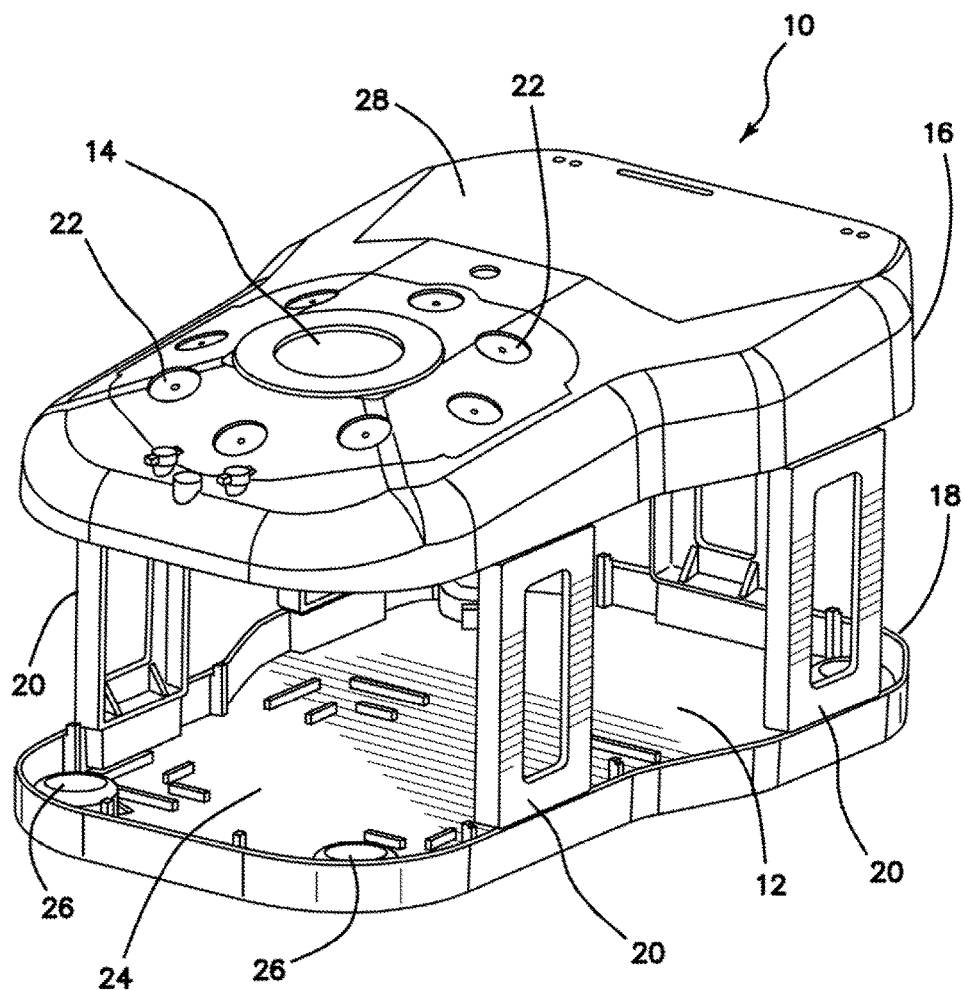
FIG. 1 illustrates a top perspective view of a surgical training device according to the present invention.

A surgical training device 10 that is configured to mimic the torso of a patient such as the abdominal region is shown in FIG. 1. The surgical training device 10 provides a body cavity 12 substantially obscured from the user and configured for receiving simulated or live tissue or model organs or training model of the like described in this invention. The body cavity 12 is accessed via a tissue simulation region 14 that is penetrated by the user employing devices to practice surgical techniques on the tissue or organ model found located in the body cavity 12. Although the body cavity 12 is shown to be accessible through a tissue simulation region, a hand-assisted access device or single-site port device may be alternatively employed to access the body cavity 12. An exemplary surgical training device is described in U.S. patent application Ser. No. 13/248,449 entitled "Portable Laparoscopic Trainer" filed on Sep. 29, 2011 and incorporated herein by reference in its entirety. The surgical training device 10 is particularly well suited for practicing laparoscopic or other minimally invasive surgical procedures.

Still referencing FIG. 1, the surgical training device 10 includes a top cover 16 connected to and spaced apart from a base 18 by at least one leg 20. FIG. 1 shows a plurality of legs 20. The surgical training device 10 is configured to mimic the torso of a patient such as the abdominal region. The top cover 16 is representative of the anterior surface of the patient and the space between the top cover 16 and the base 18 is representative of an interior of the patient or body cavity where organs reside. The surgical trainer 10 is a useful tool for teaching, practicing and demonstrating various surgical procedures and their related instruments in simulation of a patient undergoing a surgical procedure. Surgical instruments are inserted into the cavity 12 through the tissue simulation region 14 as well as through pre-established apertures 22 in the top cover 16. Various tools and techniques may be used to penetrate the top cover 16 to perform mock procedures on model organs placed between the top cover 16 and the base 18. The base 18 includes a model-receiving area 24 or tray for staging or holding a simulated tissue model or live tissue. The model-receiving area 24 of the base 18 includes frame-like elements for holding the model (not shown) in place. To help retain simulated tissue model or live organs on the base 18, a clip attached to a retractable wire is provided at locations 26. The wire is extended and then clipped to hold the tissue model in position substantially beneath the tissue simulation region 14. Other means for retaining the tissue model include a patch of hook-and-loop type fastening material (VELCRO®) affixed to the base 18 in the model-receiving area 24 such that it is removably connectable to a complementary piece of hook-and-loop type fastening material (VELCRO®) affixed to the model.

A video display monitor 28 that is hinged to the top cover 16 is shown in a closed orientation in FIG. 1. The video monitor 28 is connectable to a variety of visual systems for delivering an image to the monitor. For example, a laparoscope inserted through one of the pre-established apertures 22 or a webcam located in the cavity and used to observe the simulated procedure can be connected to the video monitor 28 and/or a mobile computing device to provide an image to the user. Also, audio recording or delivery means may also be provided and integrated with the trainer 10 to provide audio and visual capabilities. Means for connecting a portable memory storage device such as a flash drive, smart phone, digital audio or video player, or other digital mobile device is also provided, to record training procedures and/or play back pre-recorded videos on the monitor for demonstration purposes. Of course, connection means for providing an audio visual output to a larger screen other than the monitor is provided. In another variation, the top cover 10 does not include a video display but includes means for supporting a laptop computer, a mobile digital device or tablet such as an IPAD® and connecting it by wire or wirelessly to the trainer.

When assembled, the top cover 16 is positioned directly above the base 18 with the legs 20 located substantially around the periphery and interconnected between the top cover 16 and base 18. The top cover 16 and base 18 are substantially the same shape and size and have substantially the same peripheral outline. The internal cavity is partially or entirely obscured from view. In the variation shown in FIG. 1, the legs include openings to allow ambient light to illuminate the internal cavity as much as possible and also to advantageously provide as much weight reduction as possible for convenient portability. The top cover 16 is removable from the legs 20 which in turn are removable or collapsible via hinges or the like with respect to the base 18. Therefore, the unassembled trainer 10 has a reduced height that makes for easier portability. In essence, the surgical trainer 10 provides a simulated body cavity 12 that is obscured from the user. The body cavity 12 is configured to receive at least one surgical model accessible via at least one tissue simulation region 14 and/or apertures 22 in the top cover 16 or sides through which the user may access the models to practice laparoscopic or endoscopic minimally invasive surgical techniques.

Figure 2:
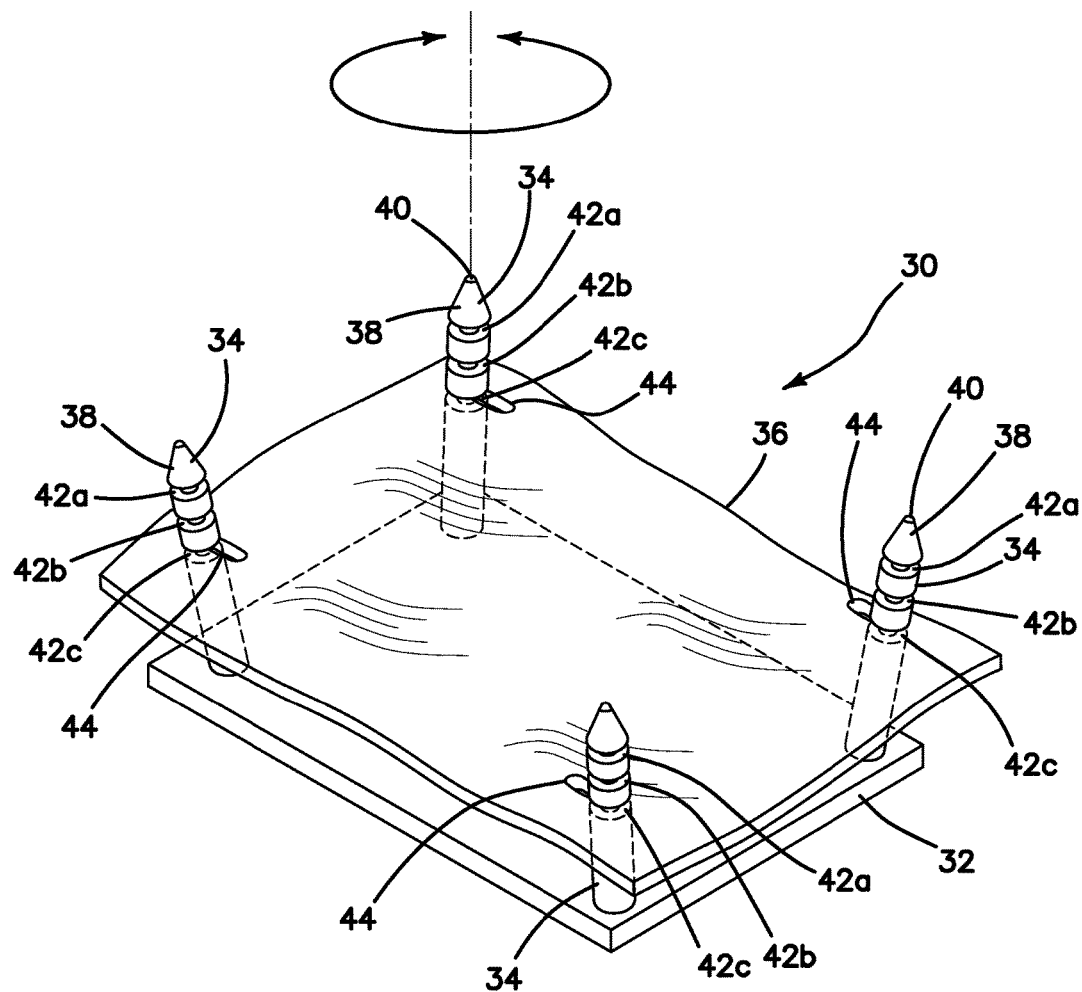
FIG. 2 illustrates a top perspective, partially transparent view of a surgical training model according to the present invention.

A surgical training model 30 according to the present invention is shown in FIG. 2. The model 30 is configured to be placed inside the surgical training device 10 described above or other surgical trainer similar to the one described above. The model 30 may also be used by itself without a laparoscopic trainer to train or practice certain procedures and surgical techniques. The model 30 includes a base 32, a plurality of posts 34, and at least one simulated tissue portion 36.

The base 32 of the model 30 is a platform that serves as a bottom support for the rest of the model 30 and it is sized and configured such that the model 30 does not tip over. The platform is made of any material such as metal or plastic. The base 32 is of sufficient heft to maintain the stability of the model 30 in the upright position while being manipulated by a user. The base 32 may include holes for receiving posts 34. Alternatively, the posts 34 may be integrally form with the base 32 as a unitary body. The model 30 is sized and configured to be placed into the body cavity 12 of the surgical trainer 10 in the location of the model receiving area 24. The underside of the base 32 is provided with means to affix the model 30 inside the surgical trainer 10. Such means to affix the model 30 inside the trainer 10 include but are not limited to adhesive, suction cup, snap-fit, magnet, and a hook-and-loop type fastener material attached to the bottom surface of the base 32 and configured to connect with a complementary hook-and-loop type fastener material or adhesive attached to the base 18 of the surgical trainer 30.

Still referencing FIG. 2, four posts 34 are connected to the base 32 of the model 30 or, alternatively, the posts 34 are integrally formed with the base 32. Each post 34 is elongate and cylindrical in shape having a proximal end connected to the base 32 and a distal end that extends upwardly from the base 32. In one variation, the distal end includes a tapered section 38 that terminates at a blunt tip surface 40 so as to not injure a user but is sharp enough to puncture holes in simulated tissue. In one variation, as shown in FIG. 2, the distal end is conical or tapered and has smoothly curved, rounded or flat tip. Each post 34 includes at least one circumferential notch 42 or cut that extends radially inwardly from the outer surface and into the post 34. In the variation shown in FIG. 2, each post 34 includes three notches 42a, 42b, 42c spaced apart along the length of the post 34 although any number of notches may be included in the post 34. The notches 34 are perpendicular to the longitudinal axis of the each post 34. In one variation, all of the posts 34 have the same number of notches 34 in the same locations or distances along the longitudinal axis. The posts 34 are spaced apart and located in substantially the four corners of the base 32. The posts 34 may be oriented perpendicular to the base 32 or angled outwardly as shown in FIG. 2 to help retain a tensioned simulated tissue portion 36 or to allow for varied tension in the simulated tissue portion 36. In one variation, the posts are movable with respect to the base 32 such that their angle with respect to the base 32 can be selected by the user in order to vary the tension on the simulated tissue portion 26. In another variation, the angle of the posts 34 are not fixed but vary within constrained parameters upon manipulation of the connected simulated tissue portion 36 thereby increasing the difficulty for the clinician in performing the surgical technique. At least one of the posts 34 angulates, shifts, tilts, wobbles or is movable with respect to base 32 in response to forces applied to the simulated tissue portion 36 by the practitioner. The proximal end of at least one post 34 is connected to the base 32 and configured such that the post angulates polyaxially or rotates polyaxially with respect to the base. In another variation at least one of the posts 34 is a flexible gooseneck which can be adjusted with the position being maintained by the gooseneck post 34 following the adjustment. The gooseneck post 34 is advantageous in adjusting the tension in the simulated tissue portion 36. The posts 34 are configured to support the simulated tissue portion 36 and to selectively locate and position the simulated tissue portion 36 in the notches 34. If the simulated tissue portion 36 is in the form of a sheet as shown in FIG. 2, then the thickness of the notches 42 is at least as thick as the thickness of the sheet forming the simulated tissue portion 36 such that the simulated tissue portion 36 is supported within and by the notches 42 and retained in the notches 42 along the posts 34 and thereby prevented from slipping or moving along the length of the post 34 as a clinician manipulates the simulated tissue portion 36. In one variation, the simulated tissue sheet 36 is approximately 0.05 inches thick and the notches are approximately 0.1 inches thick and the notches 42 are spaced apart by approximately 0.25 inches. In another variation, the notches 42 are thinner than the sheet 36 to slightly compress the sheet in position within the notch 42. For example, the notch 42 is approximately 0.08 inches and the sheet is approximately 0.1 inches. One variation includes mounting posts that have notches that are formed at the same height. For example, a post 34 is approximately 4.0 inches long and includes first, second, third and fourth notches located at approximately 1.0 inch, 1.8 inches, 2.7 inches, and 3.7 inches, respectively. The outer diameter of the posts 34 are approximately 0.3 inches and the inner diameter of the posts 34 in the location of the notches is approximately 0.23 inches.

In one variation, the posts 34 are removable from the base 32. The base 32 includes four apertures and the posts 34 are passed into the apertures from underneath the base 32. Each post 34 is provided with a flange and each aperture is keyed for allowing the flanged post 34 to pass into the aperture. Once inserted into the aperture of the base 32, the post 34 is twisted relative to the base 32 to lock the post 34 in position relative to the base 32. To remove the post 34, the post 34 is twisted in the opposite direction and pushed down through the aperture. The underside of the base 32 includes an alcove provided with detents into which the posts 34 may be snapped into for flat storage of the model. Of course, rigid posts 34 may be interchangeable with flexible/movable ones.

Still referencing FIG. 2, the simulated tissue portion 36 includes a sheet of simulated tissue material. In another variation, the simulated tissue portion can take the form and shape of a particular organ. The simulated tissue portion 36 is connected to the posts 34 and in essence suspended from the upper surface of the base by a distance defined by the distance of the notch 42 to which the simulated tissue portion is attached. The simulated tissue portion 36 is free on all sides except at the points of support at the posts 34. The simulated tissue portion 36 is mounted in tension being slightly stretched between and connected to the posts 34. The tension of the sheet may be adjusted by angulating the posts 34 or by stretching and piercing the simulated tissue portion 36 in locations closer together along the simulated tissue portion. In one variation, the simulated tissue portion 36 is a sheet of silicone. In another variation the simulated tissue portion is a sheet of fabric or mesh coated with silicone on at least one side. The fabric or mesh is a 2-way or 4-way stretch material such as stretch nylon or spandex or a stretch nylon/spandex blend mesh or fabric. The fabric or mesh material is stretchable and porous and weighs approximately 79 grams per square yard. The material of the sheet can be any polymeric material that is flexible and can stretch and may include a mesh or other reinforcement material or fiber. The silicone coating on the mesh provides a realistic tissue feel and may include a textured surface to provide the user with tactile feedback and to allow the user to grab onto the surface with graspers. The mesh, fabric, fiber or other filler material provides reinforcement to the silicone such that the sheet can hold a suture without tearing or be stretched without tearing when being manipulated or connected to the posts 34. The simulated tissue portion 36 may also be made of KRATON® or other thermoplastic elastomer.

In one variation, the simulated tissue portion 36 includes a marking or a predetermined pathway drawn on the upper surface of the at least one simulated tissue portion 36 with ink for example for the user to cut along. A shape may also be drawn which the user can practice cutting out. A pre-marked simulated tissue portion 36 provides a starting point for the user. Also, a blank simulated tissue portion 36 allows the user to draw their own line, path or shape on the simulated tissue portion 36 that then the user can cut along employing laparoscopic scissors and dissectors to practice precision cutting and then practice suturing the cut or opening closed. Furthermore, in one variation, the simulated tissue portion 36 includes pre-formed apertures 44 located along the perimeter at the four corners as shown in FIG. 2. These apertures are approximately 0.125 inches in diameter and are set back from the edges by approximately 0.413 inches. The apertures 44 are located in the four corners of the sheet 36 and are used for mounting the simulated tissue portion 36 onto the four posts 34 as shown. The simulated tissue portion 36 in the form of a sheet is approximately 1 to 10 mm thick for example. In another variation, the simulated tissue portion 36 that is formed in a sheet includes a textured upper surface and a smooth lower surface. The texturing can include protrusions or other realistic organ details. If desired, the user may flip the sheet such that the smooth surface is facing upwardly on the posts. The smooth surface may increase the difficulty in grasping and manipulating the simulated tissue portion with instruments. In another variation, the sheet of simulated tissue 36 includes several pre-cut paths and/or holes which forces the user to maintain tension on the simulated tissue portion drawing opposite sides of the hole or pre-cut path close together for suturing.

In use, a user will mount at least one simulated tissue portion 36 onto the posts 34. If the simulated tissue portion 36 includes preformed apertures 44 then mounting the simulated tissue portion 36 includes placing the apertures 44 over each post 34 and sliding the simulated tissue portion 36 to rest within one of the at least one notches 42 formed in the post 34. The simulated tissue portion 36 is mounted on all four posts 34. Fewer posts may be employed to suspend the simulated tissue portion 36. The notches 42 advantageously permit the entire sheet 36 to be mounted at an angle such that one side or at least one corner of the simulated tissue portion 36 is mounted on a higher or lower notch relative to the other corners and posts. For example, one side of the simulated tissue portion 36 is connected to two posts 34 by positioning the simulated tissue portion 36 along that first side to rest in notches 42a and the other side of the simulated tissue portion 36 is connected to two posts 34 by positioning the simulated tissue portion 36 along that second side to rest in notches 42c which are lower than notches 42a thereby angulating the simulated tissue portion 36. If the simulated tissue portion 36 is not provided with preformed apertures 44, the tapered distal ends 38 of the posts 34 can be used to puncture apertures 44 anywhere into the sheet 36. Hence, the tension in the simulated tissue portion 36 can be selected by the user when the user mounts the simulated tissue portion 36 onto the posts 34. For example, when the simulated tissue portion 36 is mounted by piercing an aperture 44 into the simulated tissue portion 36, it can then be selectively stretched making the simulated tissue portion 36 as tense or loose as the user wishes before piercing at least a second aperture 44 to mount the simulated tissue portion on another post 34 and so forth. The fabric reinforced silicone material prevents the aperture 44 from propagating. Multiple preformed apertures 44 can be included in the sheet 36 to provide different degrees of tension when the sheet is mounted using a specific set of preformed apertures 44. As the simulated tissue portion 36 in the form of a sheet is stretched over a post, it then snaps into place inside one of the notches 42. The posts 34 may include barbs, a shoulder or flange (not shown) extending outwardly from the outer surface to help retain the simulated tissue portion 36 in position together with or without notches 42. The posts 34 allow the user to set the sheet to different tensions to allow for different levels of difficulty as well as different angles to represent different structures or locations within the body.

Figure 3:
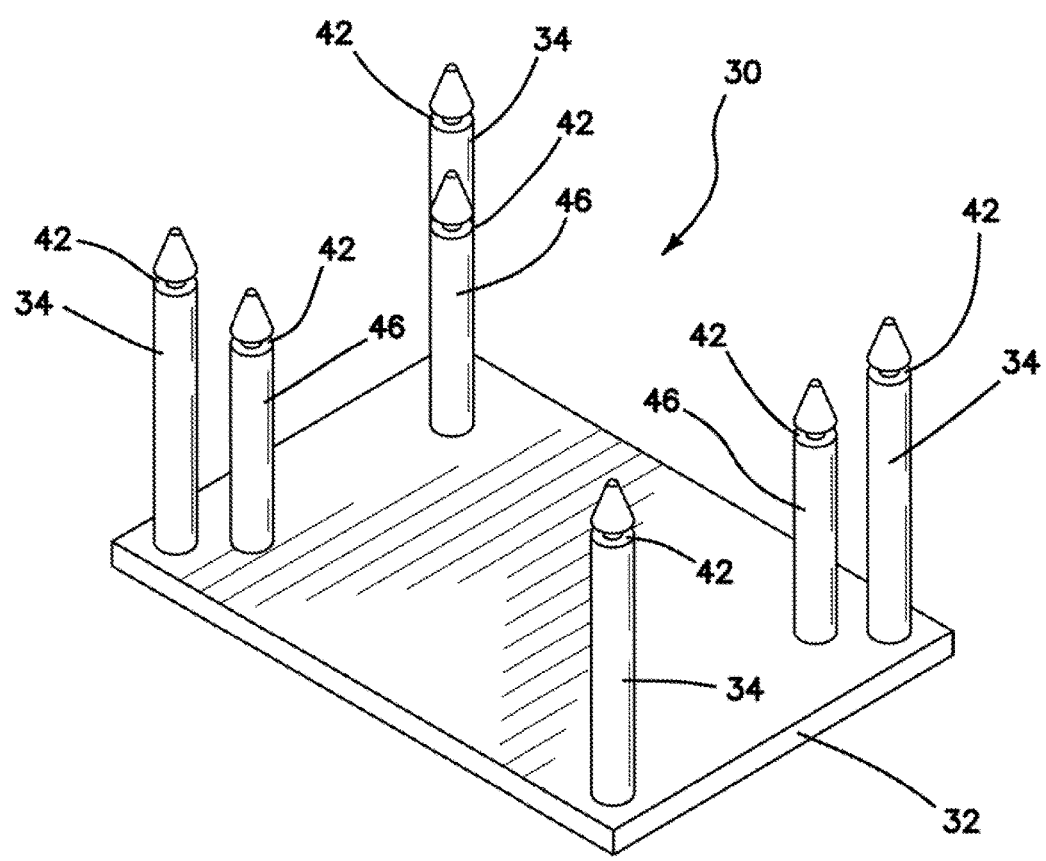
FIG. 3 illustrates a top perspective view of a model without a simulated tissue portion according to the present invention.

FIG. 3 shows a variation of the model 30 that includes more than four posts 34. In particular, there is a first or outer set of posts 34 and a second inner set of posts 46. There are four outer posts 34 and four inner posts 46 for a total of eight posts. The inner posts 46 are shorter relative to the outer posts 34. Both sets of posts are generally positioned in the four corners of the base 32 and adjacent to each other. Having two sets of posts allows greater variation or selectability in the tension or angles for mounting the simulated tissue portion 36. The second set of posts 46, like the first set of posts 34, includes notches 42 for positioning the simulated tissue portion 36. Although one notch 42 is shown in all of the posts 34, 46, the invention is not so limited and any number of notches at varying heights can be formed in the posts 34, 42. FIG. 3 does not illustrate the simulated tissue portion 36.

Figure 4:
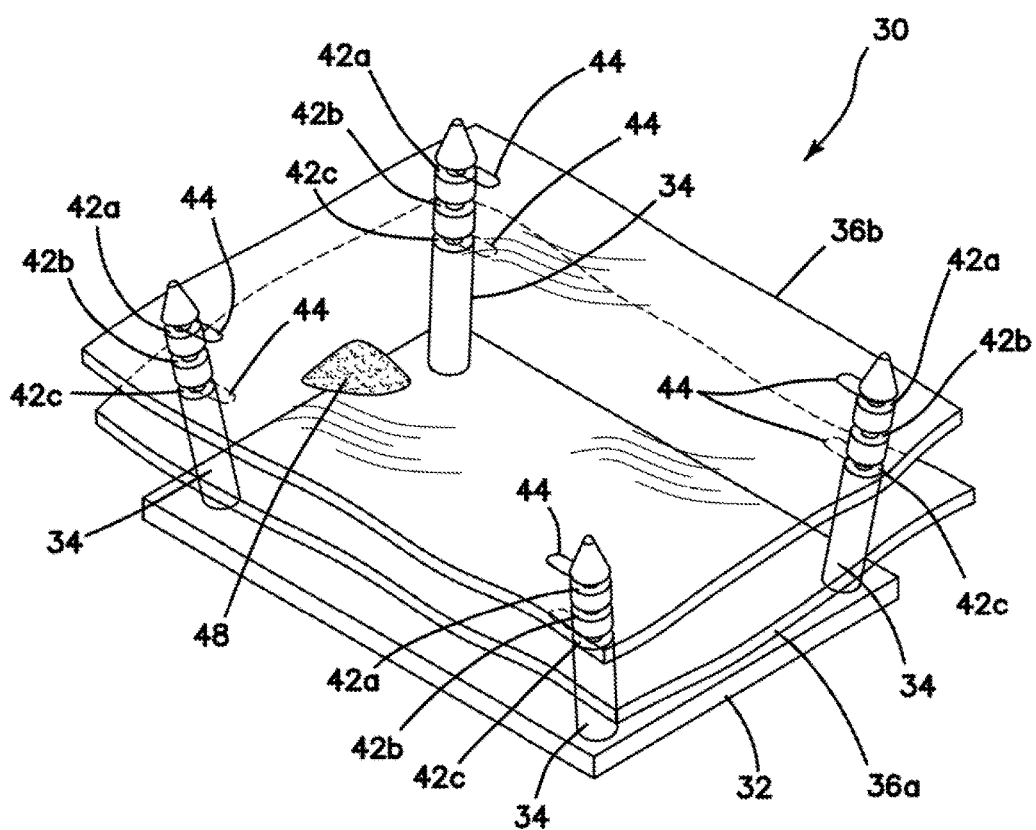
FIG. 4 illustrates a top perspective, partially transparent view of a model with two tissue simulation portions according to the present invention.

Turning now to FIG. 4, there is shown a model 30 according to the present invention having two simulated tissue portions 36a, 36b mounted on the posts 34. As shown the simulated tissue portions 36a, 36b are formed as sheets but are not so limited and may include shapes that simulate organs and other tissue structures. A first simulated tissue portion 36a is mounted onto the posts 34 and placed into notches 42c and a second simulated tissue portion is shown mounted onto posts 34 and placed into notches 42a. Of course, the second sheet 36b can be placed into the same notches as the first sheet 36a or angled in any manner with respect to the first sheet 36a which may also be angled and placed in different notches. Placing the sheets 36a, 36b in the same notches creates a layered tissue that can be used to mimic muscle tissue as found in the abdominal region. The sheets of simulated tissue 36 can be any color and include markings and vascular structures drawn on the simulated tissue structure 36 to mimic real tissue structures. The multiple sheets may all be connected together and retained with adhesive selectively applied in selected areas between the sheets. Although, two sheets 36a, 36b are shown, the invention is not limited to the number of sheets that can be mounted on the posts 34. The posts 34 can be accordingly constructed to be longer and include more notches 42 to accommodate more sheets and a wider selection of angulations. FIG. 4 illustrates a simulated tumor 48 located between the two sheets 36a, 36b. The tumor 48 can be attached to one or both of the layers 36a, 36b or not be attached. The clinician can practice making an incision in the second layer 36b to uncover the tumor 48, then practice excising the tumor 48 and then practice suturing the defect left behind in the first layer 36a if the tumor 48 was attached to the first layer 36a and then practice suturing the second layer 36b closed as well.

The model 30 is also suitable for use as a blunt dissection model. The simulated tissue sheet 36 for blunt dissection is made of silicone with no fabric reinforcement which allows the dissectors or trocars to puncture and separate the material. Multiple sheets may be layered together and attached together by means of silicone adhesive or thinner layers of silicone to allow for tissue dissections and separations of tissue planes.

The model 30 provides a realistic platform for presenting simulated tissue structures for training in a laparoscopic environment. As the clinician practices certain techniques such as cutting and suturing, the clinician will use certain instruments such as graspers, cutters, suture needles, sutures, laparoscopes, endoscopes, trocars and the like. When the simulated tissue structure that is supported on the posts in the model of the present invention is contacted with such instruments, the simulated tissue structure will give and flex under the force, deflecting a certain degree depending upon the tension with which it is mounted. This dynamism of the simulated tissue structure advantageously mimics real live tissue that gives way, moves and flexes upon manipulation in real life. Also, cutting and suturing feels differently when performed on simulated tissue structure that is suspended, that is in tension and that allows for a certain amount of deflection. These simulation advantages are provided by the model 30 of the present invention and are particularly useful when practicing laparoscopic surgical techniques that allow the user to fine tune depth perception and tissue manipulation skills while suturing, cutting and puncturing in a simulated laparoscopic environment.

While certain embodiments have been particularly shown and described with reference to exemplary embodiments thereof, it will be understood by those of ordinary skill in the art that various changes in form and details may be made therein without departing from the spirit and scope thereof as defined by the following claims.

We claim:

1. A surgical training device, comprising:
   a base;
   a top cover connected to and spaced apart from the base to define an internal cavity between the top cover and the base;
   at least one aperture or a penetrable region for accessing the internal cavity;

a laparoscopic camera insertable into the internal cavity;
a video display monitor configured to connect to an inserted laparoscopic camera and display images;
a removable model disposed inside the cavity; the model comprising at least one simulated tissue portion connected to a plurality of mounting posts that are connected in spaced apart fashion to a base; each mounting post includes at least one notch formed in the outer surface perpendicular to the longitudinal axis and configured to hold the simulated tissue portion in the location of the at least one notch such that the simulated tissue portion is suspended by a distance from the base;
wherein at least one mounting post is configured to angulate polyaxially with respect to the base and be movable with respect to the base in response to forces applied to the simulated tissue portion.

2. The surgical training device of claim 1 wherein the simulated tissue portion is a sheet of silicone.

3. The surgical training device of claim 2 wherein the sheet of silicone includes a stretchable fabric or mesh.

4. The surgical training device of claim 1 wherein the model includes two simulated tissue portions in the form of sheets.

5. The surgical training device of claim 4 wherein at least one of the simulated tissue portions includes at least one simulated tumor structure.

6. The surgical training device of claim 5 wherein the at least one simulated tumor structure is positioned between the two sheets.

7. The surgical training device of claim 1 wherein the simulated tissue portion is mounted with selectable tension on the posts and is deflectable when manipulated to simulate real tissue consistency.

8. The surgical training device of claim 1 wherein the simulated tissue portion includes a plurality of preformed apertures for mounting on the plurality of mounting posts.

9. The surgical training device of claim 1 wherein each mounting post includes a tapered distal end.

10. The surgical training device of claim 1 wherein each mounting post includes a blunt tip surface.

11. The surgical training device of claim 10 wherein each mounting post is capable of forming an aperture in the at least one simulated tissue portion.

12. A surgical training device comprising:
a base having an upper surface;
a plurality of mounting posts connected to the base and extending upwardly from the upper surface of the base; each mounting post has a proximal end connected to the base and a tapered distal end; the proximal end is connected to the base;
at least one substantially planar simulated tissue portion having an upper surface and a lower surface; the simulated tissue portion includes apertures extending between the upper surface and the lower surface; the mounting posts are configured to pass through the apertures such that the simulated tissue portion is suspended by the posts extending through the apertures; the simulated tissue portion is made of flexible and stretchable material
wherein each mounting post includes at least one notch formed in the outer surface perpendicular to the longitudinal axis and configured to hold the simulated tissue portion in the location of the at least one notch such that the simulated tissue portion is suspended within the notches and retained in the notches along the mounting posts and prevented from moving along the length of the mounting posts.

13. The surgical training device of claim 12 wherein at least one mounting post is configured to angulate polyaxially with respect to the base.

14. The surgical training device of claim 12 wherein the at least one simulated tissue portion is mounted on the mounting posts such that the simulated tissue portion is angled with respect to the base.

15. The surgical training device of claim 12 further including a second substantially planar simulated tissue portion having an upper surface and a lower surface and apertures connected to the mounting posts such that the second simulated tissue portion is suspended by the posts through the apertures; the second simulated tissue portion is made of flexible and stretchable material such that it is mounted in tension between the plurality of mounting posts; the second simulated tissue portion is located adjacent to the at least one other simulated tissue portion.

16. The surgical training device of claim 15 further including a simulated tumor located between the second simulated tissue portion and the at least one other simulated tissue portion.

17. The surgical training device of claim 15 wherein the second simulated tissue portion is disposed at an angle with respect to the at least one other simulated tissue portion.

18. The surgical training device of claim 12 wherein the at least one simulated tissue portion is made of silicone with an embedded mesh material.

19. The surgical training device of claim 12 further including four mounting posts.

20. The surgical training device of claim 19 wherein the simulated tissue portion includes four pre-formed apertures located along the perimeter of the simulated tissue.

21. The surgical training device of claim 12 wherein the at least one simulated tissue portion is mounted to the plurality of mounting posts by the user selectively piercing the at least one simulated tissue portion with the distal ends of the mounting posts.

22. The surgical training device of claim 12 further including a laparoscopic trainer comprising:
a trainer base;
a trainer top cover connected to and spaced apart from the base to define an internal trainer cavity between the top cover and the base;
at least one aperture or a penetrable region for accessing the internal trainer cavity;
a laparoscopic camera insertable into the internal trainer cavity; and
a video display monitor configured to connect to an inserted laparoscopic camera and display images;
wherein the base, mounting posts and at least one simulated tissue portion are disposed inside the trainer cavity substantially concealed from direct observation by the user for practicing laparoscopic procedures.

23. The surgical training device of claim 22 wherein the at least one simulated tissue portion includes a predetermined pathway marked on the upper surface of the at least one simulated tissue portion.

24. The surgical training device of claim 14 wherein at least one notch is formed at the same height on all mounting posts.

25. The surgical training device of claim 12 wherein the mounting posts are removable from the base and the base includes fastener features for storage of the mounting posts.

* * * * *